Aug. 11, 1953 R. J. ROCKWELL 2,648,727

PUSH-PULL WIDE BAND AMPLIFIER

Filed Oct. 4, 1949 3 Sheets-Sheet 1

INVENTOR.
RONALD J. ROCKWELL
BY
Alden D. Redfield
Charles M. Hogan
ATTORNEYS

Aug. 11, 1953 R. J. ROCKWELL 2,648,727

PUSH-PULL WIDE BAND AMPLIFIER

Filed Oct. 4, 1949 3 Sheets-Sheet 2

INVENTOR.
RONALD J. ROCKWELL
BY
Alden D. Redfield
Charles M. Logan
ATTORNEYS

Aug. 11, 1953 R. J. ROCKWELL 2,648,727

PUSH-PULL WIDE BAND AMPLIFIER

Filed Oct. 4, 1949 3 Sheets-Sheet 3

INVENTOR.
RONALD J. ROCKWELL
BY
Alden D. Redfield
Charles M. Hogan
ATTORNEYS

Patented Aug. 11, 1953

2,648,727

UNITED STATES PATENT OFFICE 2,648,727

PUSH-PULL WIDE BAND AMPLIFIER

Ronald J. Rockwell, Cincinnati, Ohio, assignor to Crosley Broadcasting Corporation, Cincinnati, Ohio, a corporation of Ohio Application October 4, 1949, Serial No. 119,401

5 Claims. (Cl. 179—171)

The present invention relates to amplifiers and specifically to a high-fidelity audio amplifier of the push-pull output type.

A primary object of the present invention is to provide a push-pull or balanced output amplifier which is characterized by a very high degree of freedom from undesired harmonics.

Another object of the present invention is to provide a two-tube amplifier having two output terminals, said amplifier being so arranged that the characteristics of both tubes are manifested at each terminal and that the signals appearing at each terminal are the resultant of the continuous operation of both tubes.

For a better understanding of the present invention, together with other and further objects, advantages and capabilities thereof, reference is made to the following description of the accompanying drawings, in which there are described six illustrative embodiments of amplifier in accordance with the invention, all of these embodiments having generic inventive attributes in common.

In the drawings:

Fig. 1 is a circuit diagram of a single-ended output signal translating circuit or amplifier, and it represents an improvement upon the basic invention illustrated in Fig. 7 of my U. S. Patent 2,446,025 issued July 27, 1948, and applied for May 10, 1946;

Figures 2, 3:
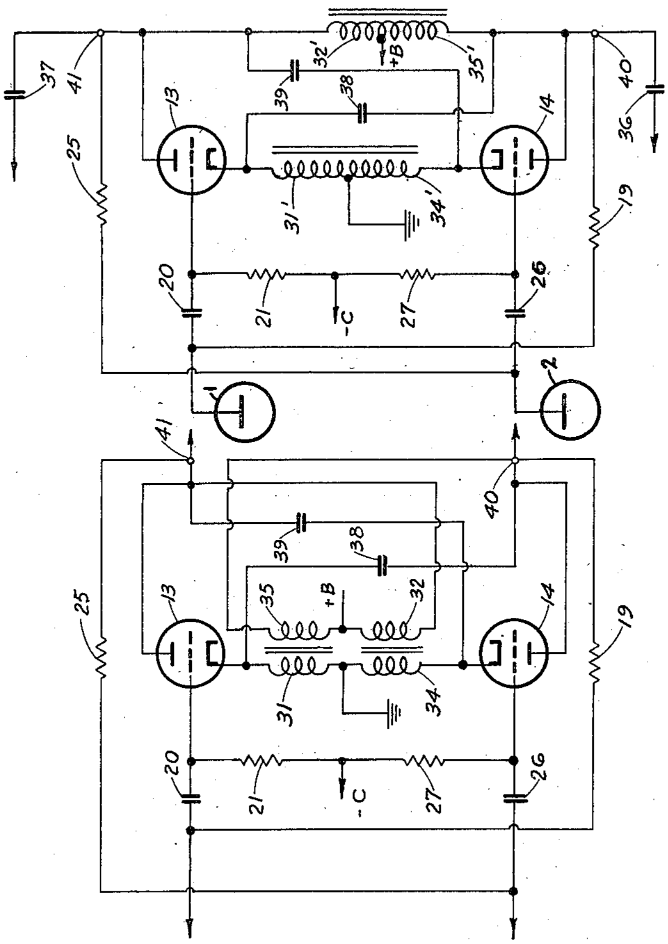
Fig. 2 is a circuit schematic of a push-pull or balanced type of amplifier which incorporates the novel features of the amplifier shown in Fig. 1.
Fig. 3 is a circuit schematic of a modified form of the invention, in which single iron core chokes are substituted for the pairs of chokes shown in the cathode and plate circuits of Fig. 2, in which the anode circuit choke is not inductively coupled to the cathode circuit choke.
Figure 5:
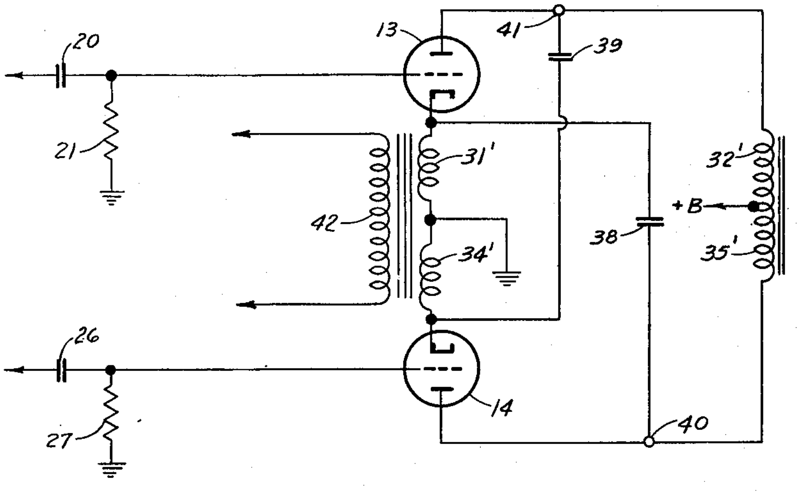
Figure 6:
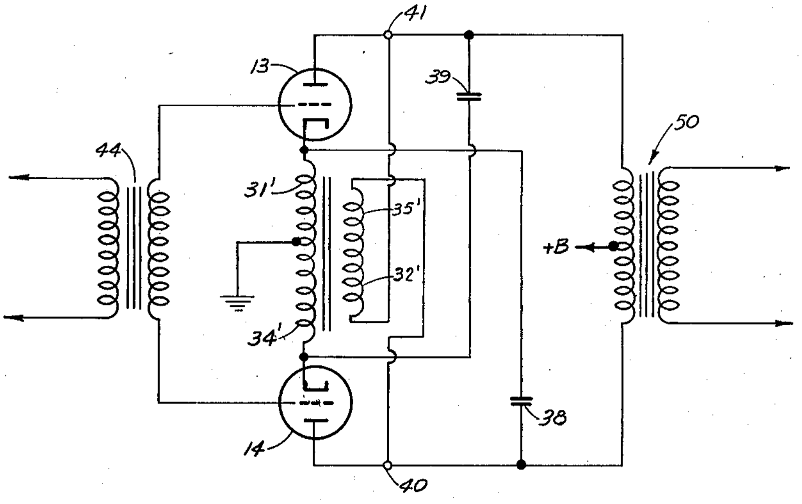

Fig. 5 discloses another embodiment resembling the Fig. 3 circuit and differing therefrom in the respect that a transformer secondary 42 is provided for a signal output circuit;

Fig. 6 illustrates an embodiment which is similar to Fig. 2 and departs therefrom primarily in the following respects: (1) in the showing of a push-pull transformer input; (2) in the provision of a transformer-type output circuit being illustrated; and the Fig. 7 embodiment is a schematic diagram of a form of the invention which closely resembles that shown in Fig. 2, inductance means again being provided for cooperating with the capacitance means for coupling the cathodes to the output terminals, and the single plate choke and single cathode choke being wound on the same core.

In accordance with the invention there is provided a push-pull amplifier comprising a pair of vacuum tubes having cathode circuits and anode circuits and a pair of output terminals, a cathode circuit of one of said tubes and an anode circuit of another of said tubes being coupled to each of said terminals.

Figure 1:
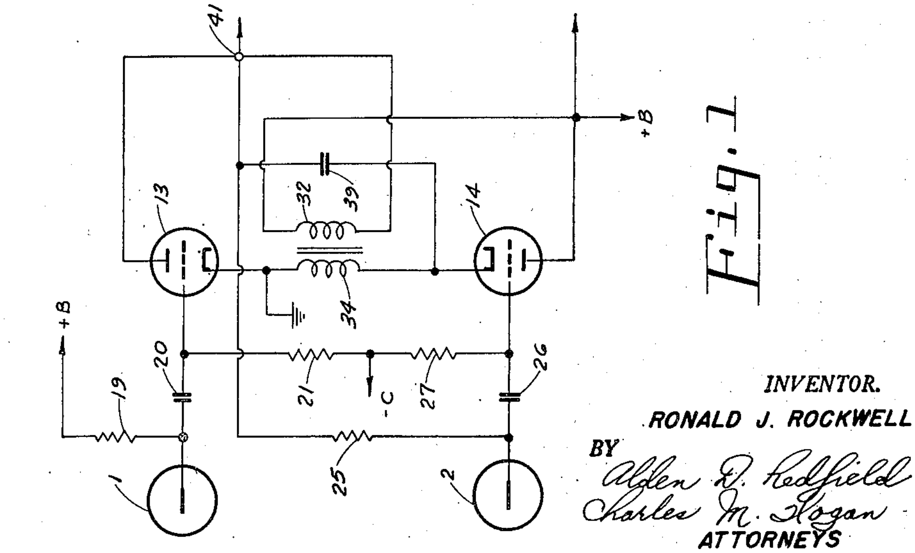
Figure 7:
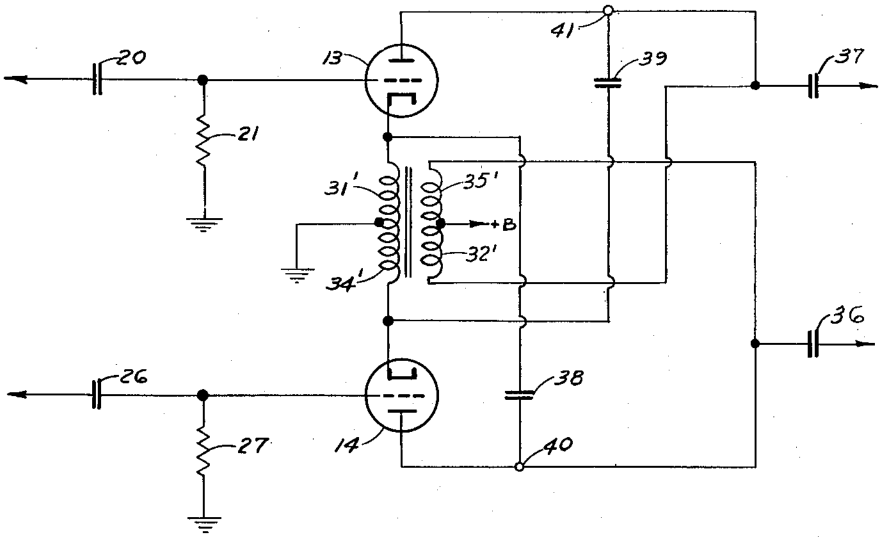

Referring now specifically to Fig. 1; this circuit resembles in many respects that illustrated in Fig. 7 of my said Patent 2,446,025. The Fig. 1 embodiment comprises a pair of driver tubes 1 and 2 for providing a push-pull input signal to the grids of a pair of amplifier tubes 13 and 14. These amplifier tubes are shown as triodes, although it will be understood that triodes, pentodes, and tetrodes are equivalents. The driver tubes are coupled to the amplifier tubes by the resistance-capacitance coupling networks, each consisting of a plate load resistor, a grid resistor, and a capacitor. Specifically, the network between driver tube 1 and amplifier tube 13 includes a plate load resistor 19, a coupling capacitor 20, and a grid resistor 21. Likewise, the network between driver tube 2 and amplifier tube 14 comprises a plate load resistor 25, a coupling capacitor 26, and a grid resistor 27. The junction of the grid resistors is connected to a source of negative biasing potential indicated by the symbol —C. The plates of tubes 1 and 14 are connected to a source of space current indicated by the symbol +B. The plate of tube 13 is connected to +B through plate choke 32. The plate of tube 2 is connected to +B through a series circuit comprising load resistor 25 and plate choke 32.

In the Fig. 1 embodiment the output signal is available between terminal 41 and ground, the space current source being included in series in this output circuit. The negative portion of the output signal wave is produced by the plate output of tube 13, and it appears across plate choke 32, connected between the anode of tube 13 and a source of space current indicated by the reference numeral +B. The junction of the anode of tube 13 and the choke 32 constitutes an output terminal 41. The positive portion of the output signal wave is taken from the cathode circuit of tube 14, which cathode circuit includes a choke 34, the high potential side of which is coupled by a capacitor 39 to the output terminal 41.

The signal translating circuit illustrated in Fig. 1 departs from that shown in my patent in that the chokes 32 and 34 are wound on the same iron core, and so poled that the direct current component flowing in choke 32 is of opposite polarity to that flowing in choke 34. The two direct current components tend to cancel each other out, therefore to minimize the resultant D. C. component which magnetizes the core. As a consequence, low frequency fidelity is improved and the problem of incremental inductance is satisfactorily solved. The Fig. 7 showing of my aforesaid patent requires that a large capacitor 39 be employed for coupling the cathode circuit of tube 14 to the output terminal 41. A 30 microfarad capacitor is there used. The size of this capacitor is radically reduced because of the supplemental coupling provided by winding choke 34 on the same core as choke 32. Accordingly, the chokes 34 and 32 are illustrated as being wound on the same iron core. The coupling between the chokes 32 and 34 is loose, and it improves the low frequency response. Even a small value of capacitance for the element 39 assures an excellent high frequency response. The combination of capacitive and inductive coupling of the cathode circuit of tube 14 to the output terminal 41 and the direct coupling of the anode circuit of tube 13 to the output terminal 41 assure a very flat and faithful response throughout a wire range of audio frequencies.

The Fig. 1 circuit relies primarily on capacitor 39 for coupling the cathode circuit of tube 14 to terminal 41, and the chokes 32 and 34 are loosely coupled and mounted on the same core for the following purposes:

First, to supplement the coupling provided by capacitor 39, permitting a capacitor of relatively small size to be used; and Second, to improve low-frequency response by minimizing the D. C. component of the magnetizing current for the core.

The provision of capacitor 39 renders the circuit of particular utility for heavy power requirements, which requirements are not satisfied by the use of bifilar windings for coupling purposes. One of the advantages of the present invention is the fact that bifilar windings are dispensed with.

The Fig. 1 circuit includes another feature shown in my said Patent 2,446,025, in that, during the negative grid excursion of driver tube 2, its positive plate excursion is augmented by the positive plate excursion at terminal 41, thus producing a positive bias excursion at the grid of tube 14 which is in excess of the positive cathode excursion of tube 14. Tube 14 is highly degenerative and requires a positive grid excursion with respect to ground which is at least equal to its cathode excursion plus its grid bias. The network 41, 25, 26, 27 in effect regeneratively couples the output reactor 32 to the input of tube 14. As stated, the effective plate potenial of driver tube 2 is increased in a positive direction as the cathode of tube 14 goes positive. Conversely, when the plate circuit of tube 13 is developing its negative output wave portion, capacitor 39, being connected between terminal 41 and the cathode of tube 14, applies a negative signal to the cathode of tube 14. This feature has the advantage that tube 14 is strongly driven.

The principles of the Fig. 1 embodiment are utilized in the Fig. 2 embodiment. Only the anodes of the driver tubes need be shown in the illustration of the Fig. 1 embodiment. The driver tubes are omitted in the other embodiments, but it will be understood that suitable push-pull driving circuits are employed in conjunction with each.

Like reference numerals are used throughout the specification and drawings to designate like elements, and therefore it will be understood that in the description of the Fig. 2 embodiment, elements bearing the same reference numerals as in Fig. 1 need not be further described.

In Fig. 2 individual chokes 31, 34 are provided for the cathode circuits of tubes 13, 14. And individual plate chokes 32, 35 are also arranged in series across the plates of the tubes, the junction of the plate chokes being connected to a source of space current +B to shunt-feed tubes 13, 14. The balanced arrangement of Fig. 2 includes two output terminals 41, 40. Terminal 41 is directly connected to the anode of tube 13, capacitively coupled to the cathode circuit of tube 14 by capacitor 39 and inductively coupled to the cathode circuit of tube 14 by chokes 34, 32, loosely intercoupled and wound on a common core. Terminal 40 is directly connected to the anode circuit of tube 14, capacitively coupled to the cathode circuit of tube 13 by capacitor 38, and inductively coupled to the cathode circuit of tube 13 by chokes 31, 35, loosely intercoupled and wound on a second common core. The high potential terminals of cathode chokes 34, 31, respectively, are coupled to output terminals 41, 40, respectively, by capacitors 39, 38, respectively.

In the Fig. 2 embodiment terminal 41 is coupled to the plate of the driver tube (not shown) corresponding to tube 2 (Fig. 1), by resistor 25, and terminal 40 is coupled to the plate of the driver tube (not shown) corresponding to tube 1 (Fig. 1) by resistor 19. The network 41, 25, 26, 27 in effect regeneratively couples the output reactor 32 to the input circuit of tube 14. Similarly, the network 40, 19, 20, 21 in effect regeneratively couples the output reactor 35 to the input circuit of tube 13. These networks increase the effective drive of the driver tubes (corresponding to tubes 1 and 2). The driver anodes are coupled to their anode supply +B by these networks.

In describing the operation of the Fig. 2 circuit, it will be assumed that the signal applied to the grid of tube 13 is going more negative and that the signal applied to the grid of tube 14 is going more positive. Tube 13 becomes less conductive, and its anode becomes more positive. Tube 14 becomes more conductive, and its cathode becomes more positive. Both of these factors render terminal 41 more positive, since it is directly connected to the anode of tube 13 and capacitively coupled to the cathode of tube 14 (by 39) and inductively coupled to the cathode of tube 14 (by 34, 32).

At the same time network 25 couples back to the anode circuit of the driver tube, corresponding to tube 2, a positive going voltage, increasing the positive drive of that tube on tube 14. Tube 14 becomes more conductive, and its anode less positive. Tube 13 becomes less conductive, and its cathode less positive. Both of these factors render terminal 40 less positive, since it is directly connected to the anode of tube 14 and capacitively coupled to the cathode of tube 13

(by 38) and inductively coupled to the cathode of tube 13 (by 31, 35).

It will be seen that each output terminal is so arranged that four events occur. In the case of terminal 41, for example:

First, a voltage is impressed on it from the anode of tube 13;

Second, a voltage is impressed on it from the cathode of tube 14, through capacitor 39;

Third, a voltage is impressed on it from the cathode of tube 14, through windings 34, 32;

Fourth, it impresses on the output of the tube, driving tube 14, such a voltage as to increase the drive of that tube (corresponding to 2, Fig. 1).

As to terminal 40:

First, a voltage is impressed on it from the anode of tube 14;

Second, a voltage is impressed on it from the cathode of tube 13, through capacitor 38;

Third, a voltage is impressed on it from the cathode of tube 13, through windings 31, 35;

Fourth, it impresses on the output of the tube, driving tube 13, such a voltage as to increase the drive of that tube (corresponding to 1, Fig. 1).

In further describing the operation of the Fig. 2 embodiment, it will now be assumed that the signal applied to the grid of tube 13 is going more positive and the signal applied to the grid of tube 14 is going more negative. Tube 13, under this assumed condition, becomes more conductive, and its anode becomes less positive. Tube 14 becomes less conductive, and its cathode becomes less positive. Both of these factors render terminal 41 less positive, since it is directly connected to the anode of tube 13 and both capacitively and inductively coupled to the cathode of tube 14. At the same time network 25 couples back to the anode of the driver tube, corresponding to tube 2, a negative going voltage, increasing the negative drive of that tube on tube 14. Tube 14 becomes less conductive and its anode more positive. Tube 13 becomes more conductive and its cathode more positive. Both of these factors render terminal 40 more positive, since it is directly coupled to the anode of tube 14 and both capacitively and inductively coupled to the cathode of tube 13.

It will accordingly be clearly understood that the characteristics of both tubes are manifested at each output terminal. The Fig. 2 amplifier accordingly permits reasonable tube tolerances and operates very well even when the tubes 13 and 14 are not precisely matched.

Referring now specifically to the Fig. 3 embodiment, it departs from the Fig. 2 embodiment in four respects:

First, a center-tapped choke having two winding portions 31′ and 34′ is substituted for the individual chokes 31 and 34;

Second, a center-tapped choke 32′, 35′ is substituted for the two chokes 32, 35;

Third, one core is provided for choke 31′, 34′, and one core is provided for choke 32′, 35′;

Fourth, the chokes 31′, 34′ and 32′, 35′ are not inductively coupled.

The operation of the Fig. 3 embodiment is the same as that of the Fig. 2 embodiment except that the output terminals 40 and 41 are not inductively coupled to the cathode circuits of tubes 13 and 14, respectively. These terminals are only capacitively coupled to those cathode circuits, because there is no mutual inductive coupling between the plate chokes and the cathode chokes. The Fig. 3 embodiment represents a distinct advance in the art, in that capacitors, even of the large size required for the Fig. 3 embodiment, are far superior to bifilar windings or other mutually coupled inductors, particularly for high power work or at high frequencies.

In the Fig. 3 embodiment coupling capacitors 36, 37 are provided at the output terminals 40 and 41. It will be understood, of course, that such capacitors may also be employed in the Fig. 2 embodiment.

The Fig. 5 embodiment is very similar to the Fig. 3 embodiment and differs therefrom in the following respects:

First, the feedback networks, including resistors 19 and 25, are omitted, so that the driver tube anodes are directly connected to their anode current supply source;

Second, the output is taken from a secondary winding 42 which is mutually inductively related to the primary winding provided by choke 31′, 34′.

The operation of the Fig. 5 embodiment is substantially the same as that of the Fig. 3 embodiment, the output signal being taken from secondary 42. The fixed-bias source −C is not shown in this embodiment.

The Fig. 7 embodiment is substantially identical to that shown in Fig. 2 and differs therefrom in the following respects:

First, a single core is provided for all of the four chokes;

Second, a center-tapped winding having portions 31′ and 34′ is substituted for the separate cathode chokes 31, 34;

Third, a single center-tapped choke having portions 32′ and 35′ is substituted for the separate chokes 32 and 35 shown in the Fig. 2 embodiment;

Fourth, the feedback networks, including resistors 19 and 25, are omitted;

Fifth, the fixed grid bias source (−C) is omitted.

The operation of the Fig. 7 embodiment will be apparent from the detailed description of the construction and operation of Fig. 2.

Referring now to Fig. 6, this embodiment resembles that of Fig. 2 and differs therefrom in the following respects:

First, a push-pull transformer input is provided by a transformer 44 in lieu of the resistance-capacitance networks 20, 21 and 26, 27;

Second, a transformer push-pull output is provided by a transformer 50 which has its primary connected between the anodes of the tubes 13, 14, the secondary providing the output signal;

Third, the source of fixed-bias is not shown;

Fourth, a single choke 31′, 34′ is substituted for the individual cathode chokes;

Fifth, a single choke 32′, 35′ is substituted for the two individual plate chokes;

Sixth, the primary of the output transformer has a center tap to which the positive terminal of the space current course (+B) is connected.

Figure 4:
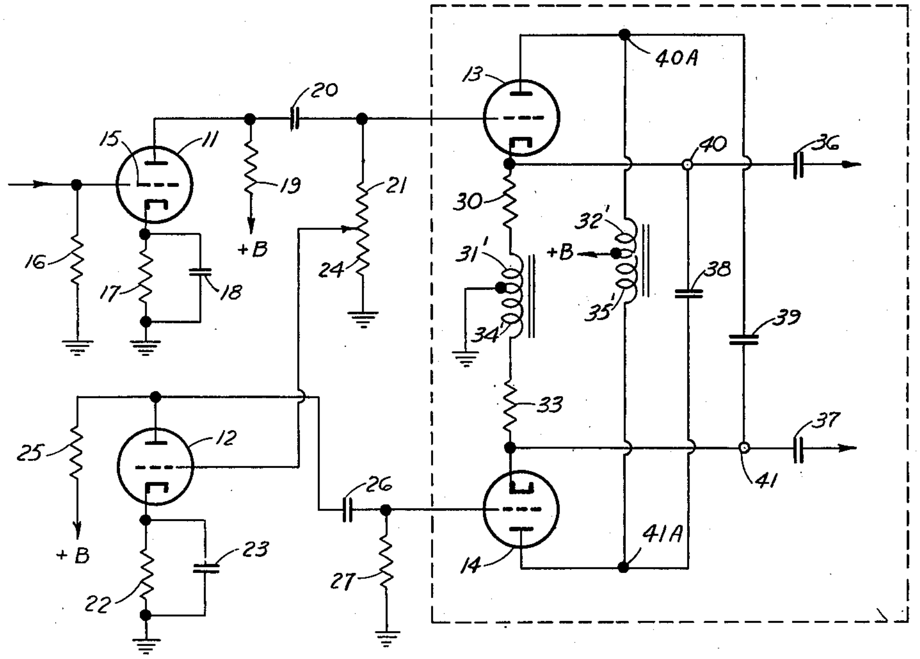
Fig. 4 is a circuit schematic of another embodiment of the invention, which differs from the Fig. 3 circuit in that the driving tubes are shown in detail, and further in that the output capacitors 36 and 37 are shown, the novel arrangements for increasing the effective anode potentials of the driver tubes being omitted.

The Fig. 4 embodiment is substantially the same as the Fig. 3 embodiment except that the feedback networks including resistors 19 and 25 are omitted, and the details of a suitable push-pull driving arrangement are shown.

In Fig. 4 there is shown a driver tube 11, a phase inverter tube 12, and a pair of amplifier tubes or triodes 13 and 14, the latter, together with associated circuit arrangements, being included within the rectangular outline. It will be understood that the novel arrangements of the invention are shown within the block diagram so far as the Fig. 4 embodiment is concerned, and that any conventional network for applying an input signal in push-pull to the amplifier shown within this block may be employed. In the specific embodiment, a single-ended or unbalanced audio signal is applied to the control electrode 15 of amplifier tube 11, the latter being provided with a grid resistor 16 and a cathode resistor 17, by-passed by a capacitor 18. The signal output of tube 11 is applied to the control electrode of amplifier tube 13 through a conventional coupling network, comprising a load resistor 19, a coupling capacitor 20, and a grid resistor 21. The control electrode of tube 12, which tube is provided with a cathode resistor 22, by-passed by a capacitor 23, is driven from an adjustable tap 24 on resistor 21. The output of tube 12 is coupled to the input of tube 14 through a conventional network comprising plate load resistor 25, coupling capacitor 26, and grid resistor 27. The input circuit arrangements supply push-pull input signals to the amplifier unit. Any of the conventional expedients may be employed for that purpose.

Amplifier tube 13 has a cathode circuit comprising a series combination of a resistor 30 and an iron core choke 31' and a plate circuit comprising an iron core choke 32'. Tube 14 is similarly provided with a cathode circuit comprising a resistor 33 and an iron core choke 34' and an anode circuit comprising an iron core choke 35'. The junction of the cathode chokes is grounded and the junction of the plate chokes is connected to the positive terminal of a source of space current (not shown), indicated by the symbol +B. In this embodiment the output signals are taken in push-pull from the two cathodes by a pair of capacitors 36 and 37 which are individually connected to the cathodes of tubes 13 and 14. It will be observed that a push-pull amplifier is provided by the elements 13, 14, 30, 31', 32', 33, 34', 35', 36, and 37. In accordance with the invention greater fidelity and power output is obtained by capacitively coupling the plate circuit of one tube and the cathode circuit of another to each output terminal. Specifically, the anode of tube 14 is coupled as by a capacitor 38 to the high potential side of resistor 30. Additionally, the anode of tube 13 is coupled as by a capacitor 39 to the high potential side of resistor 33.

The operation of the Fig. 4 embodiment will be readily apparent in the light of the foregoing description. It will be assumed that the audio signal voltage input to tube 11 is on the positive portion of its cycle, so that the plate output of tube 11 is on the negative portion of its cycle, and the input to tube 13 is accordingly negative. Tube 12 acts as a phase inverter and inverts the output of tube 11, applying a positive signal to tube 14. Output terminal 40 is then on the negative portion of its signal by reason of two factors: (1) the decreased conductivity of tube 13 which renders the high potential side of its cathode circuit more negative; (2) the increased conductivity of tube 14, which renders its anode output more negative. Similarly, the output terminal 41 is in the positive portion of its cycle, the decreased conductivity of tube 13 causing its anode to become more positive and the increased conductivity of tube 14 causing the high potential side of its cathode circuit also to become more positive. When the signal input applied to tube 11 is on the negative portion of its signal, terminal 40 then is on the positive portion of its cycle and terminal 41 is on the negative portion of its cycle.

In one successful embodiment of the present invention according to Fig. 4, the following illustrative parameters were found to be satisfactory:

| Element: | Description |
|---|---|
| Resistor 16 | 1 megohm |
| Resistor 17 | 500 ohms |
| Resistors 21, 24 | 1 megohm potentiometer |
| Resistor 27 | 1 megohm |
| Resistor 22 | 500 ohms |
| Resistor 19 | 10,000 ohms |
| Resistor 25 | 10,000 ohms |
| Resistor 30 | 500 ohms |
| Resistor 33 | 500 ohms |
| Capacitor 38 | 100 mfds. |
| Capacitor 39 | 100 mfds. |
| Capacitor 36 | 100 mfds. |
| Capacitor 37 | 100 mfds. |
| Capacitor 18 | 100 mfds. |
| Capacitor 20 | .25 mfd. |
| Capacitor 23 | 100 mfds. |
| Capacitor 26 | .25 mfd. |
| Choke 31, Choke 34 | 50 henries center-tapped |
| Choke 32, Choke 35 | 50 henries center-tapped |
| Tube 11 | small triode |
| Tube 12 | small triode |
| Tube 13 | 2A3 |
| Tube 14 | 2A3 |

In Fig. 4 the output is taken directly from the cathode circuits of tube 13, 14, terminals 40 and 41 being directly connected to the cathodes. It will be understood, of course, that the output may be taken from points 40A and 41A (i. e., the anodes of the tubes).

Class A operation is preferred for all embodiments of this invention.

It will be understood that the capacitors 38 and 39 which are used in the Fig. 2 and Fig. 7 embodiments, for example, are considerably smaller in value than the capacitors 38 and 39 which are employed in the Fig. 4 embodiment, for which illustrative parameters have been given. It will also be understood that the term "loosely coupled" as used herein is intended to designate the types of coupling wherein no special precautions and designs are employed to assure tight coupling. It will further be understood that the signal output can be taken from the amplifier in various ways, such as by a transformer (Fig. 6) and capacitors (Fig. 7). It will be obvious to those skilled in the art that the output signal can also be taken by tapping down either the plate or the cathode chokes or by the provision of a tertiary winding.

While there have been shown and described what are considered to be the preferred embodiments of the present invention, it will be obvious to those skilled in the art that various modifications and substitutions of equivalents may be made therein without departing from the true scope of the invention as defined in the appended claims.

I claim:

1. In combination, a wave signal amplifier comprising a pair of push-pull connected amplifier tubes each having a cathode circuit, a control electrode, and an anode circuit, a common inductive reactance in said anode circuits and connected directly between the anodes, said anodes providing output terminals, means for capacitively coupling the cathode of one of said tubes to the anode of the other tube, means for capacitively coupling the cathode of said other tube to the anode of said one tube, a driving circuit comprising a second pair of push-pull connected tubes each having an anode, resistance-capacitance coupling means for coupling the anodes of said driver tubes to the control electrodes of said amplifier tubes, a source of space current having its positive terminal connected to said reactance to provide anode voltage for the amplifier tubes, and resistors directly cross-connecting the anodes of the amplifier tubes to the anodes of the driver tubes, so that said space-current source provides anode voltage for the driver tubes.

2. The combination of two push-pull connected driver tubes each having an output anode circuit, a pair of push-pull connected output tubes each having a cathode and anode, means for A. C. coupling the driver tubes to the output tubes, an anode load connected to the anodes of both of said output tubes, a direct current power source having a positive terminal symmetrically connected to said load and a negative terminal symmetrically connected to the cathodes of said output tubes, a pair of individual means for A. C. coupling the cathode of each output tube to the anode of the other output tube, each of said individual means being in series circuit relation to said power source so as to be charged by said source, and resistors directly cross-connecting the anodes of said output tubes to the anodes of the driver tubes, so that there is supplied to the anodes of said driver tubes D. C. power together with regeneratively fedback A. C. components from said output tubes.

3. A push-pull wide band amplifier, comprising, a first electronic amplifier tube having a first anode, cathode and control electrode, a second electronic amplifier tube having a second anode, cathode and control electrode, a negative voltage terminal, a positive anode voltage terminal, conductive means including a resistor and a first reactive impedance directly connected between said negative terminal and said first cathode, conductive means including a resistor and a second reactive impedance directly connected between said negative voltage terminal and said second cathode, a third impedance directly connected between said positive anode terminal and said second anode, a fourth impedance directly connected between said positive anode terminal and said first anode, a condenser of substantially zero impedance at the lowest frequency for which said amplifier is designed directly coupling said first cathode to said second anode, and a condenser of substantially zero impedance at the lowest frequency for which said amplifier is designed directly coupling said first anode to said second cathode, means for applying input signals in push-pull relation to said control electrodes, and means for biasing said control electrodes to provide anode current flow in at least one of said tubes in response to any finite signal, said first, second, third and fourth impedance being equal to each other for all frequencies of said wide band.

4. The combination in accordance with claim 3 wherein said impedances are inductances.

5. The combination in accordance with claim 3 wherein said first and second impedances are inductances wound on a common core, and wherein said third and fourth impedances are inductances wound on a common core.

RONALD J. ROCKWELL.

References Cited in the file of this patent

UNITED STATES PATENTS

| Number | Name | Date |
|---|---|---|
| 2,161,844 | Babler | June 13, 1939 |
| 2,201,345 | Percival | May 21, 1940 |
| 2,202,506 | Robin | May 28, 1940 |
| 2,273,997 | Rubin | Feb. 24, 1942 |
| 2,281,345 | Willwacher et al. | Apr. 28, 1942 |
| 2,284,181 | Usselman | May 26, 1942 |
| 2,313,330 | Finch | Mar. 9, 1943 |
| 2,407,074 | Green | Sept. 3, 1946 |
| 2,411,517 | Busignies | Nov. 26, 1946 |
| 2,446,025 | Rockwell | July 27, 1948 |
| 2,477,074 | McIntosh | July 26, 1949 |
| 2,502,822 | Burton | Apr. 4, 1950 |

FOREIGN PATENTS

| Number | Country | Date |
|---|---|---|
| 892,851 | France | May 23, 1944 |